(12) United States Patent
Kobayashi (10) Patent No.: US 8,726,771 B2
(45) Date of Patent: May 20, 2014

(54) INSERT, HOLDER, AND CUTTING TOOL USING SAID INSERT AND HOLDER

(75) Inventor: Youji Kobayashi, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 364 days.

(21) Appl. No.: 13/378,639

(22) PCT Filed: Jun. 23, 2010

(86) PCT No.: PCT/JP2010/060659
§ 371 (c)(1),
(2), (4) Date: Dec. 15, 2011

(87) PCT Pub. No.: WO2011/001873
PCT Pub. Date: Jan. 6, 2011

(65) Prior Publication Data
US 2012/0087750 A1   Apr. 12, 2012

(30) Foreign Application Priority Data

Jun. 29, 2009   (JP) .................................. 2009-154341
Jul. 30, 2009   (JP) .................................. 2009-177724

(51) Int. Cl.
*B23B 31/107*   (2006.01)
*B23B 29/04*   (2006.01)

(52) U.S. Cl.
USPC ............... 82/160; 407/97; 407/106; 407/108

(58) Field of Classification Search
CPC .... B23B 27/005; B23B 27/141; B23B 27/22;
B23B 25/02; B23B 31/107; B23B 31/1074;
B23B 31/1075; B23B 27/16; B23B 27/1611;
B23B 29/04
USPC ................... 407/40, 42, 97, 106, 108; 82/160
See application file for complete search history.

(56) References Cited

U.S. PATENT DOCUMENTS

| | | | | |
|---|---|---|---|---|
| 2,203,104 A | * | 6/1940 | Reaney | ......................... 407/108 |
| 2,654,610 A | * | 10/1953 | De Vlieg | ........................... 279/6 |
| 3,044,322 A | * | 7/1962 | George | ........................... 408/16 |

(Continued)

FOREIGN PATENT DOCUMENTS

| | | |
|---|---|---|
| DE | 9218472 | 8/1994 |
| EP | 0264642 | 4/1988 |
| EP | 0973625 | 1/2000 |
| JP | 11-104904 | 4/1999 |
| JP | 2001-71204 | 3/2001 |

(Continued)

OTHER PUBLICATIONS

International Search Report issued in PCT/JP2010/060659 dated Jul. 27, 2010.

(Continued)

*Primary Examiner* — Will Fridie, Jr.
(74) *Attorney, Agent, or Firm* — Schlee IP International, P.C.; Alexander R. Schlee (57) ABSTRACT

Provided is an insert that has good positioning precision and sufficient rigidity. Said insert is rod-shaped and has: a shank part; cutting blades formed on both sides of the shank part; and raised surfaces that are positioned between the cutting blades and the shank part and bulge such that parts farther away from the cutting blades are progressively closer to the outer surface of the shank part. In a side view, the rake face of the cutting blade on one side and the raised surface on the other side are disposed in the same direction with respect to the axis of rotation of the shank part.

8 Claims, 9 Drawing Sheets

(56) References Cited

U.S. PATENT DOCUMENTS

| | | | |
|---|---|---|---|
| 3,148,561 A * | 9/1964 | Krampert | 408/181 |
| 3,542,528 A * | 11/1970 | Bech | 407/37 |
| 3,753,624 A * | 8/1973 | Walker et al. | 408/159 |
| 6,354,179 B1 * | 3/2002 | Leuze | 82/160 |
| 7,407,349 B2 * | 8/2008 | Kaiser et al. | 408/180 |
| 2007/0072521 A1 | 3/2007 | Tsuchida | |

FOREIGN PATENT DOCUMENTS

| | | |
|---|---|---|
| JP | 2001-518850 | 10/2001 |
| JP | 2005-18620 | 7/2005 |

OTHER PUBLICATIONS

Extended European Search Report issued in EP10794042 on Mar. 6, 2013.

* cited by examiner

INSERT, HOLDER, AND CUTTING TOOL USING SAID INSERT AND HOLDER

CROSS-REFERENCE TO RELATED APPLICATION

This application is a national phase of the International Patent Application PCT/JP2010/060659 filed on Jun. 23, 2010 that claims the priority from the Japanese patent applications 2009-154341 filed on Jun. 29, 2009 and 2009-177724 filed on Jul. 30, 2009.

BACKGROUND OF THE INVENTION

The present invention relates to insert, holder and cutting tool using the same.

Conventionally, those manufactured by inserting, into a holder, a substantially rod-shaped insert (hereinafter simply referred to as an insert) that has a cutting edge on both ends thereof, and is clamped by tightening with a bolt, are known as a cutting tool used for grooving an inner diameter or threading.

Patent Document 1, for example, discloses a cutting tool manufactured by inserting, into a hole of a holder, one end of a substantially rod-shaped insert having a cutting edge on both ends thereof. Also, disclosed is that the position in the axial direction of the insert is determined by abutting contacting with a flank surface on one end of the insert against an adjustment member within the holder.

However, although the position in the axial direction is determined with relatively good accuracy, index accuracy regarding the center height of the insert is poor. That is, for determining the position of the center height, a plane (a plane portion on the upper surface side) perpendicular to the center height direction is provided on the outer peripheral surface of the upper side of the insert to press and, for example, clamp the plane portion on the upper surface side by screwing. Therefore, when pressed by screwing, sometimes the insert ends up rotating slightly; hence, experienced training is required to constantly maintain the center height when repeatedly securing the insert. As a result, variations in the accuracy of repetitive mounting become significant. Furthermore, because the plane portion on the upper surface side is provided, the cross-section area of the insert becomes small, resulting in a problem of deterioration in its rigidity.

Patent Document 1: Japanese Unexamined Patent Application Publication No. 2001-71204

SUMMARY OF THE INVENTION

The objective of the present invention is to provide an insert with better accuracy for adjustment while having sufficient rigidity, a holder for the insert, and a cutting tool comprising the insert and the holder.

According to one aspect of the invention, the insert has a rod shape and comprises a shank part, a cutting edge formed respectively on both sides of the shank part, and a rising surface located between the cutting edge and the shank part protruding so as to approach the outer peripheral surface of the shank part as it moves away from the cutting edge, wherein, when viewed from a side surface, a rake surface of the cutting edge on one side and the rising surface on the other side thereof are arranged in the same direction with respect to the rotational axis of the shank part.

DETAILED DESCRIPTION OF THE INVENTION

In an embodiment, a chip pocket is formed between the rising surface and the cutting edge provided on the same side when viewed from the shank part.

In an embodiment, the rising surface is flat in a cross-sectional view perpendicular to the longitudinal direction and the end part thereof connected to the chip pocket is concave-shaped when viewed from the side surface parallel to the longitudinal direction.

In an embodiment, in a cross-sectional view perpendicular to the longitudinal direction, a flat part is formed on the outer periphery of the shank part, on a side opposite to the position at which the rising surface is formed.

A holder of the present invention comprises an insertion hole at the tip end part for inserting and securing the insert, with an adjustment member in abutting contact with the rising surface of the insert provided in the insertion hole thereof.

In an embodiment, an adjustment member mounting-hole penetrating from the outer peripheral surface to the insertion hole is provided and a rod-shaped adjustment member is inserted into the adjustment member mounting-hole.

In an embodiment, a screw hole penetrating from the outer peripheral surface into the insertion hole is formed on the tip end side relative to the adjustment member, and a screw member is fit into the screw hole to press and clamp the outer peripheral surface of the shank part of the insert by the tip end of the screw member.

In an embodiment, after the screw member is fit into the screw hole, when the tip end of the screw member is in abutting contact with the outer peripheral surface of the shank part of the insert, the abutting contact part of the screw is provided off-set from a rotational axis of the pressing member so as to pull the insert into the inserting part following the rotation of the pressing member.

In an embodiment, a mounting support member located on the tip end side relative to the adjustment member and penetrating from the outer peripheral surface into the insertion hole is provided in the insertion hole, and prevents the cutting edge on the side inserted into the insertion hole from contacting the adjustment member when the insert is inserted into the insertion hole.

In an embodiment, a through-hole penetrating from the outer peripheral surface into the insertion hole is provided and the rod-shaped mounting support member is inserted into the through-hole.

In a cutting tool of the present invention, the above insert is inserted into an insertion hole that is formed at a tip end of a holder and clamps the rising surface in abutting contact with the adjustment member provided with the holder.

According to an insert of the present invention, in case of using a cutting edge on one side, a rising surface on the cutting edge side on the other side arranged in the same direction as the one cutting edge with respect to the rotational axis of the shank part functions as a surface for limiting the center height direction and the longitudinal direction and is capable of constraining rotations of the insert when securing the insert, while having good index precision in determining the position of the center height. Furthermore, the cross-sectional area may be largely kept, providing sufficient rigidity in comparison to conventional shapes in which a plane part is provided on the upper surface side of a shank part.

Because the rake surface of the cutting edge on one end and the rising surface of the other end are arranged so as to face substantially the same direction, even if the cutting edge is pressed by a work material during a cutting process and a force lifting up the other end of the insert is applied, the suppressing part of the rising surface on the other end constrains the insert from being lifted so as to be firmly clamped, allowing vibration of the insert during cutting to be constrained.

BRIEF DESCRIPTION OF THE DRAWINGS

FIGS. 2 (a), (b) and (c) are an upper plan view, a side view, and an end surface view of the insert shown in FIG. 1.

FIGS. 5(a), (b) and (c) are an upper plan view, a side view and an end surface view of the cutting tool shown in FIG. 4, respectively.

DETAILED DESCRIPTION OF THE DRAWINGS

Figure 1:
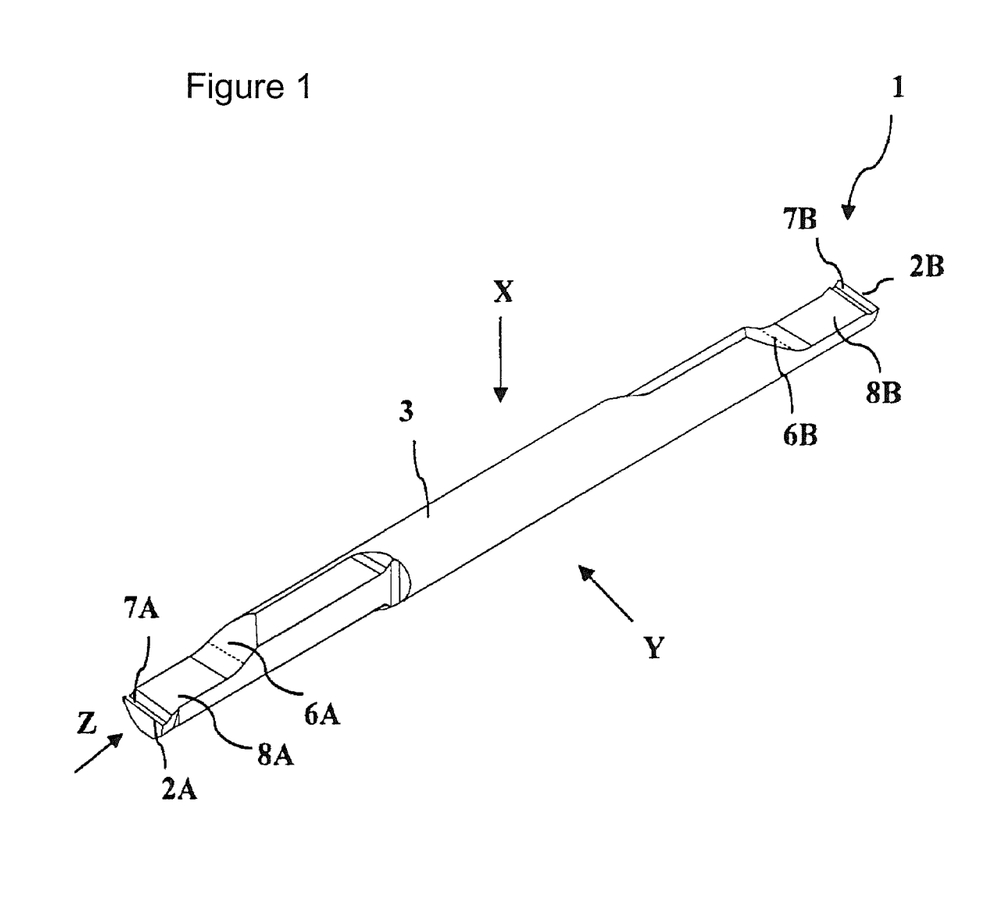
FIG. 1 is a perspective view schematically illustrating a whole insert according to an embodiment of the present invention.
Figure 2:
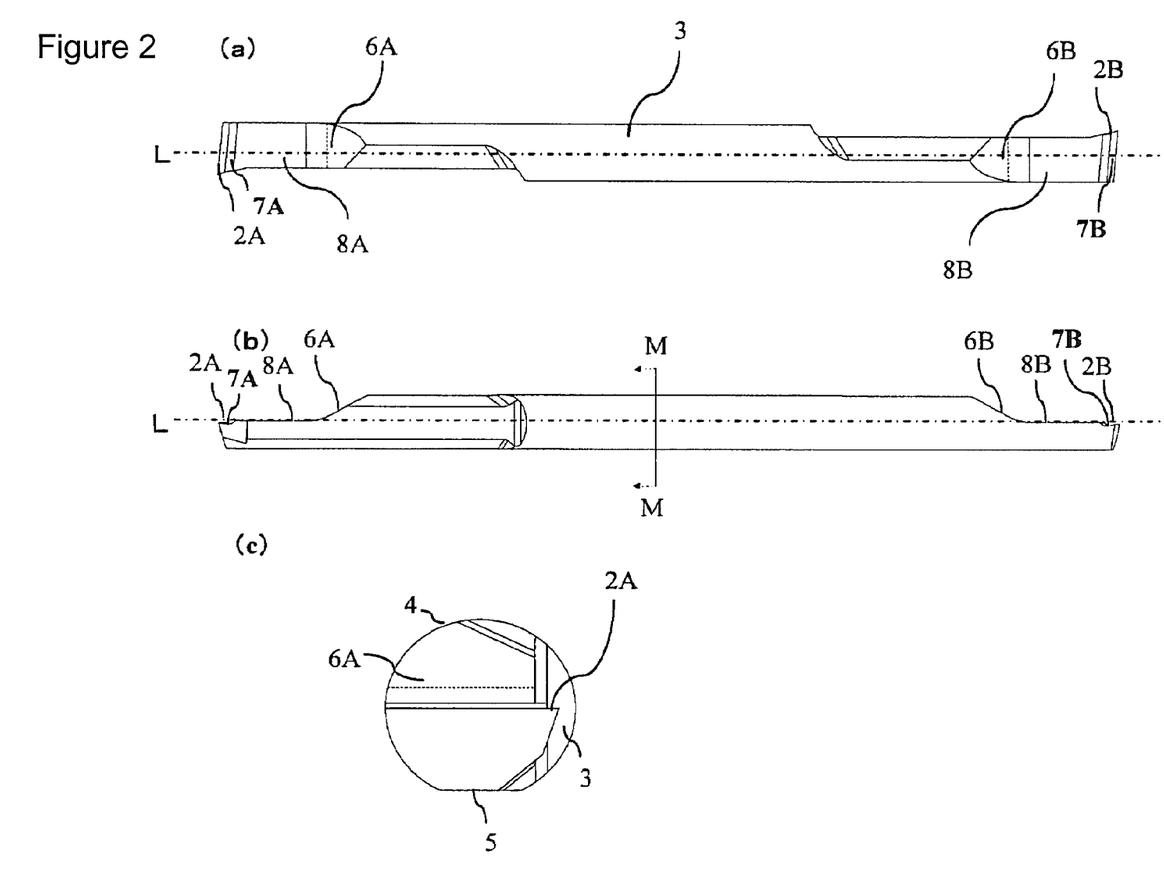
Figure 3:
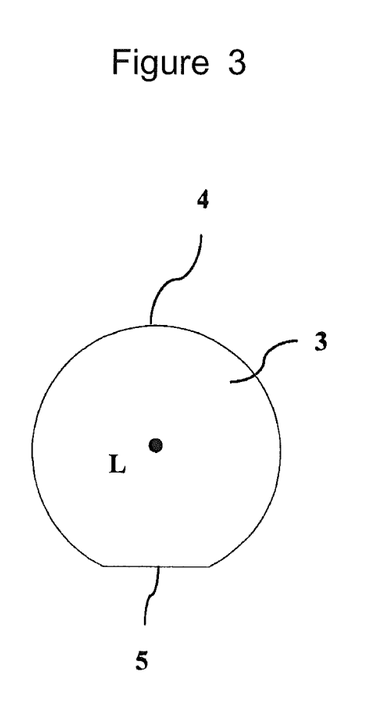
FIG. 3 is a cross-sectional view taking from the M-M line shown in FIG. 2 (a).
Figure 4:
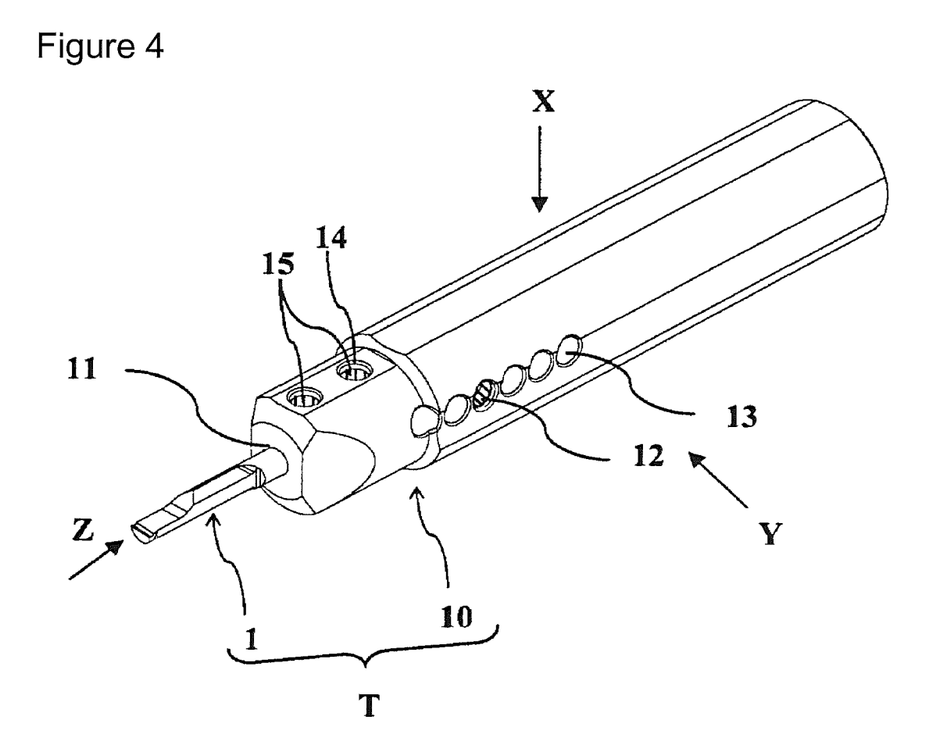
FIG. 4 is a perspective view schematically illustrating a whole cutting tool, with using the insert shown in FIG. 1, according to an embodiment of the present invention.
Figure 5:
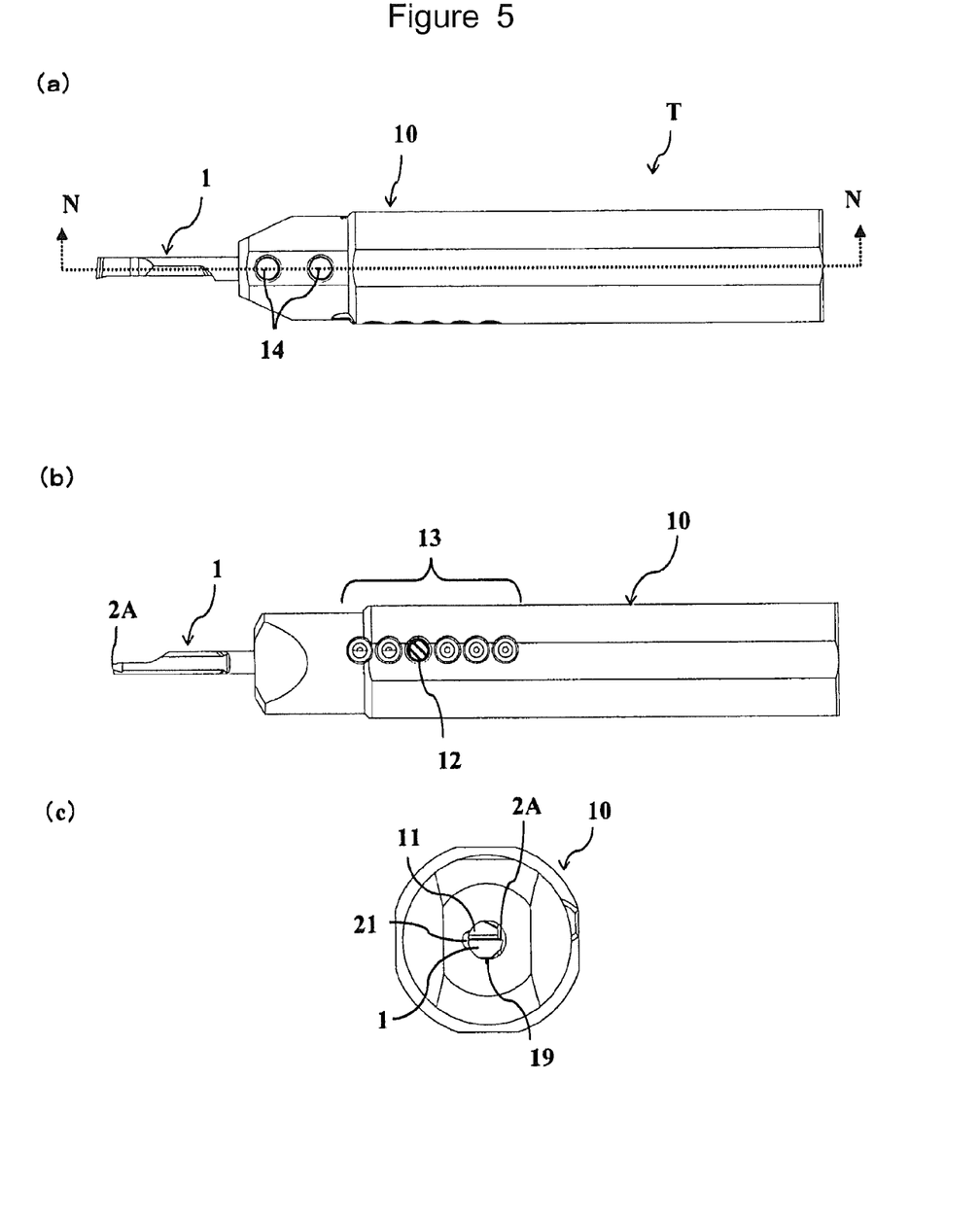
Figure 6:
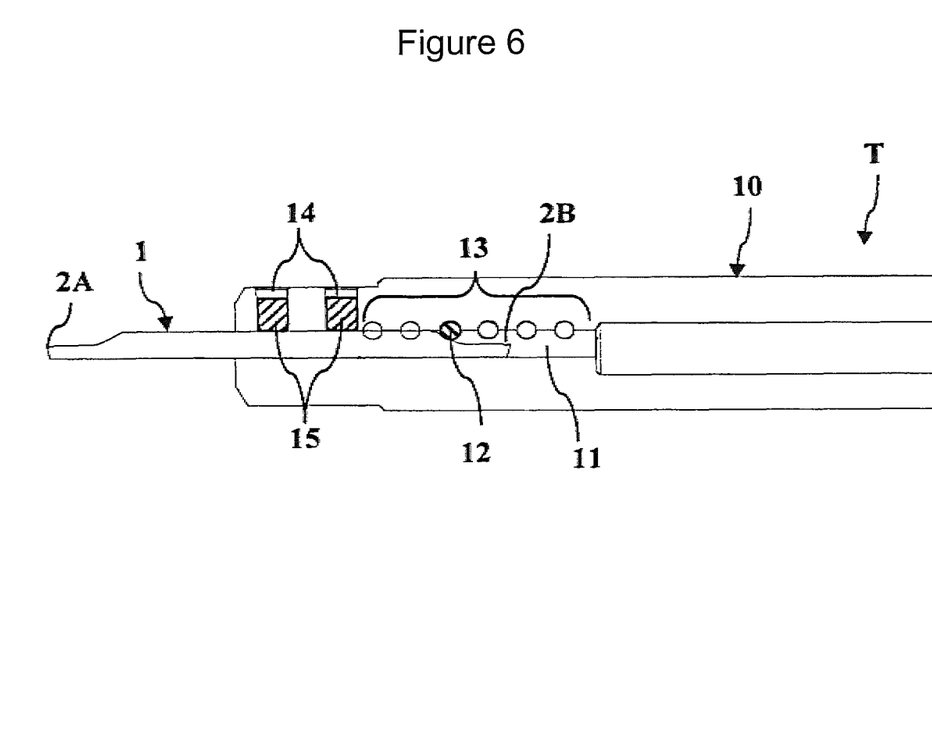
FIG. 6 is a cross-sectional view taking from the N-N line shown in FIG. 5 (a).

Hereinafter, using FIGS. 1 to 6, a cutting tool T for the machining of an inner diameter used by mounting, to a holder 10, an insert which is an embodiment of the present invention, is described. FIG. 1 is a schematic perspective view illustrating the insert 1, FIG. 2 is (a) an upper plan view of the insert 1 shown in FIG. 1 viewed from the X-direction (upper surface direction), (b) a side view viewed from the Y-direction (side surface direction), and (c) an end surface view viewed from the Z-direction (tip end direction), and FIG. 3 is a cross-sectional view taking from an M-M cross-section shown in FIG. 2 (a). Furthermore, FIG. 4 is an a perspective view schematically illustrating a whole cutting tool cutting tool T with the insert 1 mounted on the holder 10, FIG. 5 is a upper plan view looking at the cutting tool T of FIG. 4 from (a) the X-direction (upper surface direction), (b) a side surface view viewed from the Y-direction (side surface direction), and (c) an end surface view viewed from the X-direction (tip end direction), and FIG. 6 is a cross-sectional view taking from the N-N line shown in FIG. 5 (b).

As shown in FIG. 1, the insert 1 is composed of a rod-shaped body and includes cutting edges 2 (2A, 2B) respectively located on both ends thereof and a shank part 3 located between these cutting edges 2. The rod-shaped body indicates a shape that is substantially cylindrical, a substantially polygonal shape, or a shape combining these as a standard shape. In the present embodiment, the shank part 3 is substantially circular at the M-M cross-section longitudinally in the center part.

The insert 1 is an insert bar for which two corners can be used and two cutting edges are present. In the present embodiment, as shown in FIG. 2(a), both cutting edges 2A and 2B are formed protruding toward the side with respect to a part (a chip pocket 8 as well as a rising surface 6 in FIG. 2(a)) capable of inserting into the inner diameter of a work material of the insert 1. This function is also effective with a rod shaped-insert in the present invention that does not have a rising surface 6 but has a cutting edge on both ends thereof.

Between the cutting edge 2 and the shank part 3, a rising surface 6 (1A, 6B) is formed respectively. The rising surface 6 protrudes so as to approach the outer peripheral surface 4a as it moves away from the cutting edge 2 toward the shank part 3. In case of using the cutting edge 2B at the tip end on the side opposite the rising surface 6a, that is, in case of inserting the cutting edge 2A into an insertion hole 11 of the holder 10, the rising surface 6 functions as a restraining part to limit the center height direction, the longitudinal direction, and the rotating direction by being caused to abut against an adjustment member 12 formed in the insertion hole 11 of the holder 10. The index precision in determining the center height position is also good. The cross-section area may be largely maintained, providing sufficient rigidity in comparison to conventional shapes in which a plane part is provided on the upper surface side of a shank part.

The shape of the rising surface 6 is not particularly limited. The cross-sectional view perpendicular to the longitudinal direction of the insert 1 is preferably flat, but the side-surface view parallel to the longitudinal direction may also be a flat surface, a concave surface (particularly, a concave-curved surface), or a combination of these surfaces. In terms of preventing the insert 1 from breaking due to stress applied during cutting, it is preferable to have a smooth connection without any bending points between the chip pocket 8 to be described later and the rising surface 6 when viewing a side surface of the insert parallel to the longitudinal direction of the rising surface. In view of this, the part of the rising surface 6 connected to the chip pocket 8 preferably has a concave surface.

In the present embodiment, as shown in FIG. 2(b), the chip pocket 8 is formed between the rising surface 6 and the cutting edge 2 and temporarily retains chips generated by the cutting edge 2 at the chip pocket 8 so as to gradually discharge the chips from a space between the internal wall surface of a work material and the insert 1, preventing the chips from clogging around the cutting edge 2 and hampering the cutting, even if a large amount of chips are momentarily generated.

According to the configuration of FIG. 1, the rake face 7 of one end of the cutting edge 2A and the rising surface 6B on the other end are arranged in the same direction to the rotational axis of the shank part 3, and the rising surface 6A as well as 6B are also arranged in the same direction with respect to the rotational axis. According to such a configuration, even if a force is generated so as to lift the other end of the insert 1 when the cutting edge 2 is pressed by a work material during a cutting process, the other rising surface 6B works so as to suppress the lifting of the insert and is capable of firmly securing the insert, allowing vibrations of the insert 1 to be constrained during cutting. Because a position of the insert is determined by forcing the rising surface 6B directly be in abutting contact with the adjustment member 12, the mounting accuracy of the cutting edge 2 is high and also screws do not become loose in comparison to a screwing method by providing a plane part on the side surface of a shank part and making the screw in abutting contact with the plane part against screwing members from the outer periphery of a holder.

As shown in FIG. 3, a flat part 5 is formed on the outer periphery of the shank part 3, on the side opposite to the rising surface 6 in a cross-sectional view perpendicular to the longitudinal direction. The flat part 5 is formed as a notch to avoid a mounting support member 19 so that the insert 1 may be inserted into the insertion hole 11 of the holder 10 in case of forming the mounting support member 19 which is described later. This configuration has a function that makes it possible to reliably mount the insert 1 with confidence without accidentally damaging the cutting edge 2 of the insert 1 prior to a cutting process. Because the rising surfaces 6A and the 6B are facing substantially the same direction according to the configuration shown in FIG. 2, one flat part 5 can support the mounting of both cutting edges 2A and 2B, making it is possible, for that part, to keep the cross-sectional area of the shank part 3 largely such that the shank part 3 is sufficiently rigid.

On one hand, regarding the holder 10, as shown in FIG. 4, an insertion hole 11 for inserting the insert 1 is provided at the tip end part of the holder 10 and an adjustment member 12 in abutting contact with the rising surface 6 of the insert 1 is provided within the insertion hole 11. In FIG. 4, a large number of adjustment member mounting-holes 13 for inserting the rod-shaped adjustment member 12 are provided on the side surface of the holder 10. The rod-shaped adjustment member 12 is inserted into one of mounting holes 13 of the adjustment member mounting-holes 13. A large number of adjustment member mounting-holes 13 are provided such that this configuration becomes capable of appropriately adjusting the amount of protrusion of the insert 1.

The adjustment member 12, for example, is not particularly limited as long as it is in abutting contact with the rising surface 6 of the insert 1 such as pins or screws. If the adjustment member is a pin, it is easy to insert or pull out, making it possible to easily change the amount of protrusion of the insert; hence, a pin is used as adjustment member 12 in the present embodiment. Furthermore, the adjustment member 12 is provided such that the axis of the adjustment member 12 becomes perpendicular with respect to the longitudinal direction of the insertion hole 11.

Figure 9:
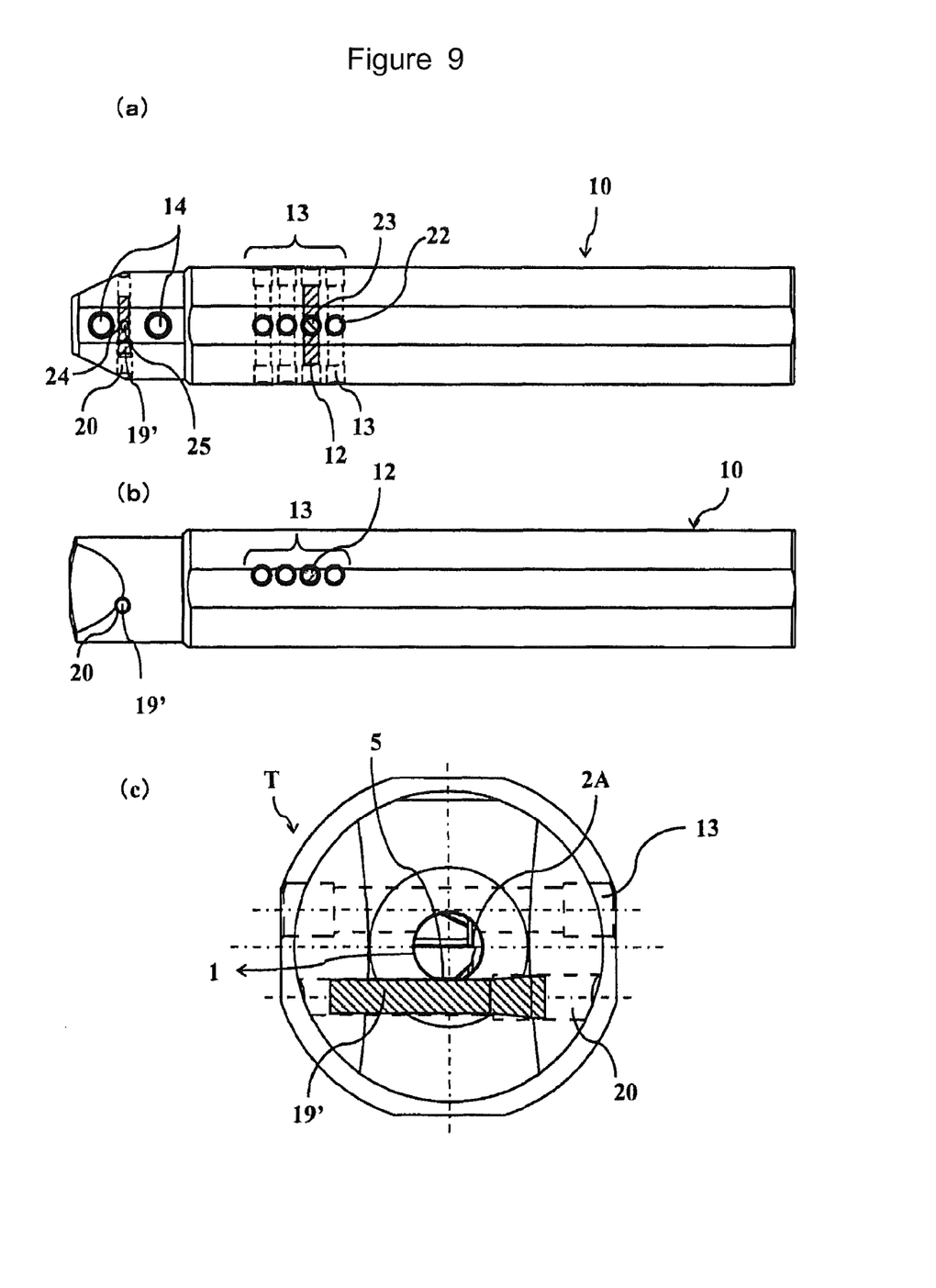
FIG. 9 is an illustration showing a structure of a mounting support member to be attached to a cutting tool according to the present invention.

Regarding the securing method of the adjustment member 12, the following may be used: a securing method by pinching both ends of a cylindrically-shaped pin with screws, a method by providing a thread for an end part on one side of a cylindrically-shaped pin and fitting the thread part to the thread part also provided for the holder 10, a securing method by forming one end of a cylindrically-shaped pin into a tapered shape with an enlarged diameter and making the tapered part contact with a predetermined location of the adjustment member mounting-holes 13, a method of securing a cylindrically-shaped pin with an adhesive, and a securing method by fastening a screw member from the side surface of a cylindrically-shaped pin. In FIG. 9, which is an embodiment to be described later, a method by fastening a screw member in from the side surface of a cylindrically-shaped pin is employed.

Figure 7:
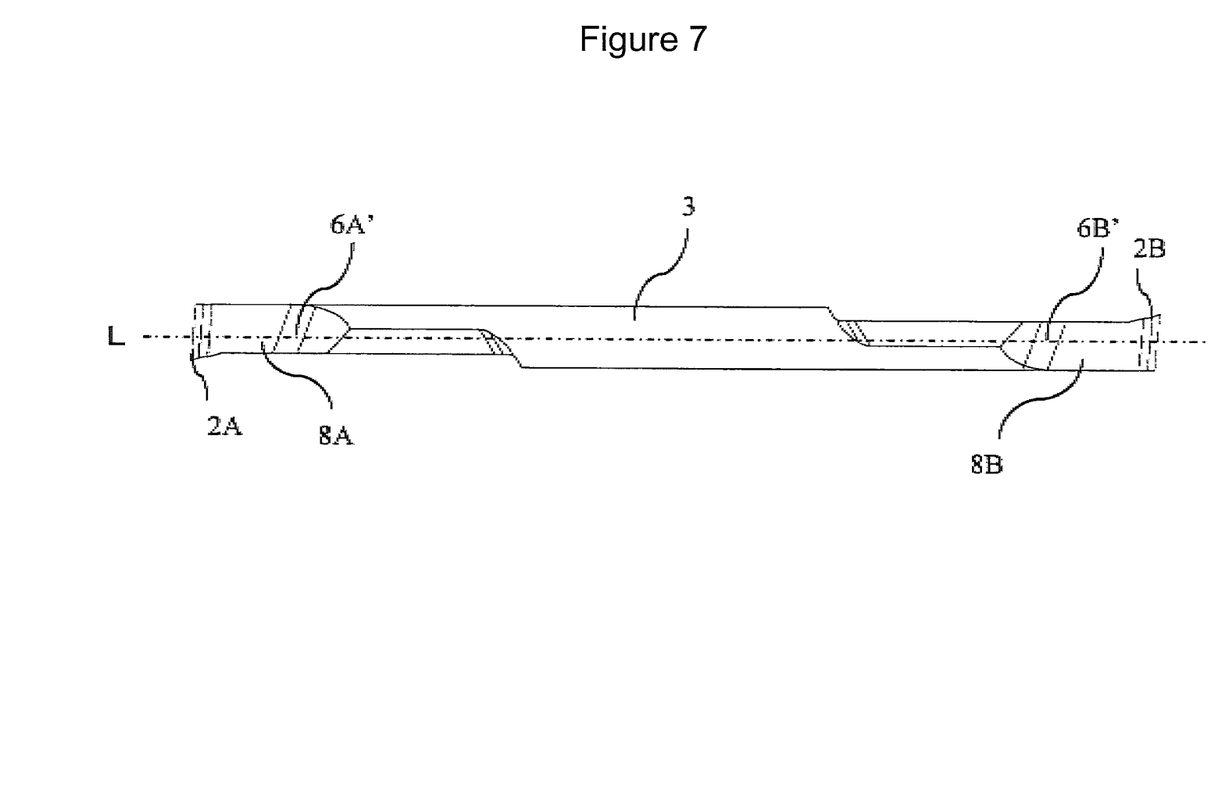
FIG. 7 is a side view of the insert shown in FIG. 2(b) according to another embodiment.

The position within the insertion hole of the adjustment member 12 may be appropriately adjusted according to the insertion angle of the rising surface of the insert 1. The rising surface 6 of the insert 1 preferably comes into linear contact with the adjustment member 12, and if the adjustment member 12 is a cylindrically-shaped pin, for example, it is preferably configured such that, in the event of mounting the insert 1 on the holder 10, the direction perpendicular to the longitudinal direction of the rising surface 6 and the direction perpendicular to the longitudinal direction of the holder 10 on the outer peripheral surface of the adjustment member 12 is parallel. Accordingly, restraining can be made stable and strong. Each of the rising surfaces 6 (6A, 6B) may be a shape parallel to a direction perpendicular to the longitudinal direction (axial line L) of the insert 1, or an inclining shape when viewed from the upper surface with respect to the direction perpendicular to the longitudinal direction as shown in FIG. 7, instead of the rising surface 6' (6A', 6B') being parallel to the direction perpendicular to the longitudinal direction.

As shown in FIGS. 4 and 5, in addition to the adjustment member 21, screw holes 14 penetrating from the outer peripheral surface of the holder 10 into the insertion hole 11 are formed on the tip end side of the holder relative to the adjustment member 12 so as to fit the screw member 15 into the screw hole 14 to press and clamp the outer peripheral surface of the shank part 3 of the insert 1 at the tip end of the screw member 15 in order to constrain the falling off or playing of the insert 1. Then, a curved surface for the outer peripheral surface of the shank part 3 is preferably in abutting contact with the screw member 15. That is, if the shank part 3 comes into a planar contact with the screw member 15 on a plane, due to the influence of manufacturing variations, the insert 1 may rotate and end up being mounted thereon; hence, the mounting position is shifted.

Figure 8:
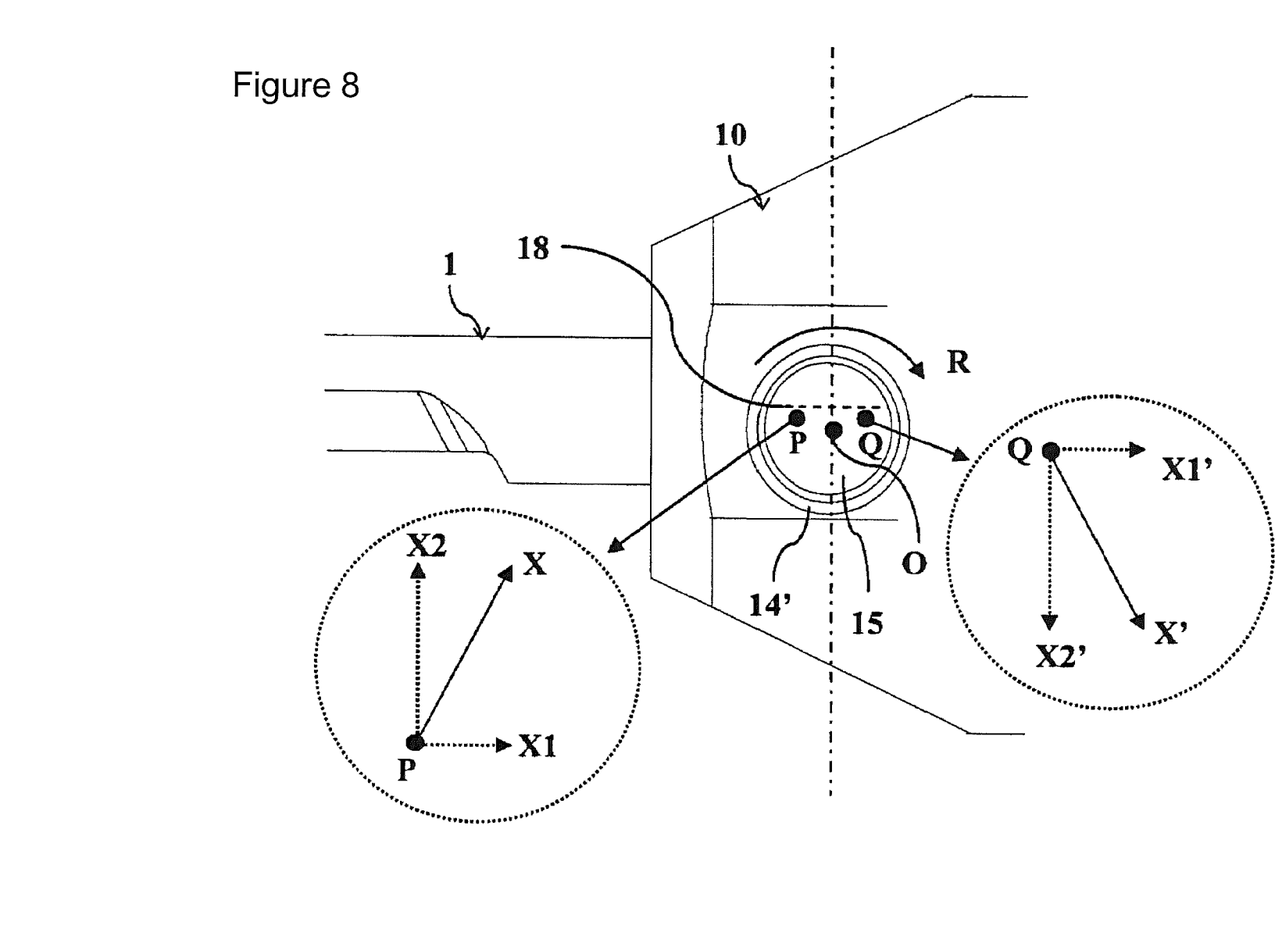
FIG. 8 is an enlarged view of the essential parts of the cutting tool, with using the insert shown in FIG. 1, according to another embodiment of the present invention.

As shown in another embodiment in FIG. 8, regarding the positional relationship of the screw hole 14 and the screw member 15, it is also possible to have a configuration in which the tip end of the screw member 15 is in abutting contact with the outer peripheral surface 4 of the shank part 3 of the insert 1 and in which a screw hole 14' is formed so as to be arranged off-set from the rotational center axis O of the screw member 15 as if pulling the insert 1 into the rear side of the insertion hole 11 by an abutting contact part 18 following the rotation of the screw member 15. It is indicated that a force ×1 pulling the insert 1 into the rear end direction of the holder 10 is generated at both points P and Q of FIG. 8 (b).

Furthermore, as shown in FIGS. 5(c) and 9, in the event of inserting the insert 1, for example, a mounting support member 19 is preferably provided within the insertion hole 11 for preventing the cutting edge 2B from being damaged if the inserting direction of the insert 1 is incorrect (in case of inserting, for example, the insert by rotating 180° around an axis of the insert with respect to the inserting direction of the insert 1). According to the configuration, in case of inserting the insert 1 into the insertion hole 11 in a wrong direction, such a mounting support member 19 blocks the insertion of the insert 1 by causing other parts besides the cutting edge 2B to contact the mounting support member 19 such that the cutting edge 2 of the insert 1 is prevented from being chipped by mistake when the insert is inserted in the holder 10.

As a specific configuration of the mounting support member 19, for example, a form of inserting the insert 1 into the insertion hole 11 is cited in which the flat part 5 formed at a location away from the cutting edge 2 of the insert 2 passes by the side of the mounting support member 19. Although the mounting support member 19 protrudes towards the inside from the internal wall of the insertion hole 11 of the holder 11, it is configured such that the mounting support member 19 is on the outside relative to the mounting position of the cutting edge 2 when the insertion hole 11 is viewed from the tip end side (the distance from the center of the insertion hole 11 to the cutting edge 2 is shorter than the distance from the center of the insertion hole 11 to the protruding part of the mounting support member) 19 in order to prevent collision of the cutting edge 2.

Furthermore, as shown in FIGS. 4 and 5(c), it may be configured that the mounting support member 19 is inserted, in a substantially cylindrically-shaped notch provided near the opening part of the insertion hole 11, a cylindrically-shaped (rod shape) mounting support member 19 from the tip end side of the insertion hole 11 into a position where the side face thereof slightly protrudes into the insertion hole 11, or to configure the mounting support member also by providing a through-hole 20 located on the tip end side of the holder 10 relative to the adjustment member 12 penetrating from the outer peripheral surface of the holder 10 to the insertion hole 11 such that a cylindrically-shaped (rod shape) mounting support member 19' is inserted into the through-hole 20 as shown in FIG. 9.

As other methods for preventing a cutting edge from chipping due to a mounting mistake or an accident of the insert, as shown in FIG. 5(c), a method may be considered for preventing the cutting edge 2 from colliding with the surroundings of the insertion hole 11 when the cutting edge 2 passes the opening part of the insertion hole 11 by providing a notch-groove 21 with an arch-shaped cross-section on an internal wall surface of the insertion hole 11 of the holder 10. In addition, a method of covering and protecting the surface of the unused cutting edge 2, which is inserted into the insertion hole 11, with a protecting sheet, or a method of marking a position matching mark for a prescribed position on the outer peripheral surface of the shank part 3 and the vicinity of the opening part of the insertion hole 11 of the holder 10, is also effective.

As a method for securing the adjustment member 12, as shown in FIG. 9, a configuration has been employed by providing screw holes 22 communicating from a direction perpendicular with respect to the adjustment member mounting-holes 13 into which fit the cylindrically-shaped adjustment member 12 so as to fit a screw member 23 into the screw hole 22.

The cutting tool T in the present invention for which the above insert 1 is mounted on the holder 10 clamps the adjustment member 12 provided inside the insertion hole 11 in a state of abutting the rising surface 6 thereto by inserting the insert 1 into the insertion hole 11 of the holder 10 as shown in FIGS. 4 to 6. According to such a configuration, favorable index precision may be obtained when determining the position in the longitudinal direction of the insert 1 and the center height direction, and the rotation of the insert may also be constrained during cutting.

REFERENCE NUMERALS 1 insert
2(2A, 2B) cutting edges
3 shank part
4 outer peripheral surface
5 flat part
6(6A, 6B) rising surface
7(7A, 7B) rake surface
8(8A, 8B) chip pocket
10 holder
11 insertion hole
12 adjustment member
13 adjustment member mounting-hole
14, 14' screw hole screw member
18 abutting contact part
19, 19' mounting support member
20 through-hole
21 notch-groove
T cutting tool

What is claimed is:

1. A cutting tool, comprising:
   a holder with an insertion hole at a tip end part of the holder and with an adjustment member;
   an insert having a rod-shape, the insert having a first end and a second end and being inserted with its second end in the holder through the insertion hole, the insert further comprising:
   a shank part comprising a first end, a second end, a peripheral portion extending over some distance between the first end and the second end, and a center axis;
   a first cutting edge formed at the first end of the insert and a second cutting edge formed at the second end of the insert;
   a first rising surface located between the first cutting edge and the peripheral portion of the shank part, said first rising surface being inclined in a direction away from the first cutting edge from a position closer to the center axis towards the outer peripheral portion of the shank part;
   a second rising surface located between the second cutting edge and the peripheral portion of the shank part, said second rising surface being inclined in a direction away from the second cutting edge from a position closer to the center axis towards the outer peripheral portion of the shank part;
   a first rake face extending from the first cutting edge at the same inclination orientation as the second rising surface; and
   a second rake face extending from the first cutting edge at the same inclination orientation as the first rising surface; wherein
   the adjustment member is in abutting contact with the second rising surface of the insert for determining the position of the insert with respect to the holder, a threaded hole extends from an outer peripheral surface of the holder into the insertion hole, and a screw member is threaded into the screw hole to press and clamp the outer peripheral portion of the shank part of the insert by a front end of the screw member.

2. The cutting tool according to claim 1, wherein a first and second chip pocket is formed between the first and second rising surface and the first and second cutting edge.

3. The cutting tool according to claim 2, wherein the first and second rising surfaces are flat and connected by a concave part to the first and second chip pockets.

4. The cutting tool according to claim 1, further comprising a flat part that is formed on the outer periphery of the shank part on a side of the outer periphery that is opposite to a side where the first and second rising surfaces are formed.

5. The cutting tool according to claim 1, wherein an adjustment member mounting-hole penetrating from the outer peripheral surface to the insertion hole is provided and a rod-shaped adjustment member is inserted into the adjustment member mounting-hole.

6. The cutting tool according to claim 1, wherein the front end of the screw member comprises an abutting contact part that is in abutting contact with the outer peripheral surface of the shank part of the insert, the abutting contact part of the screw member being eccentric with regard to a rotational axis of the screw member so as to pull the insert into the insertion hole when rotating the screw member.

7. The cutting tool according to claim 1, wherein a mounting support member is provided closer to an end of the holder in relation to the adjustment member and extends from the an outer peripheral surface of the holder into the insertion hole, said mounting support member preventing the cutting edge on the side inserted into the insertion hole from contacting the adjustment member when the insert is inserted into the insertion hole.

8. The cutting tool according to claim 7, wherein a through-hole extends from the outer peripheral surface of the holder into the insertion hole and the mounting support member is rod-shaped and inserted into the through-hole.

* * * * *